(12) United States Patent
Shin et al.

(10) Patent No.: US 12,430,726 B2
(45) Date of Patent: Sep. 30, 2025

(54) SEMANTIC IMAGE EXTRAPOLATION METHOD AND APPARATUS

(71) Applicant: PIXTREE CO., LTD., Seoul (KR)

(72) Inventors: Jaeseob Shin, Seoul (KR); Sungul Ryoo, Seoul (KR); Sehoon Son, Seoul (KR); Hyeongduck Kim, Gyeonggi-do (KR); Hyosong Kim, Seoul (KR)

(73) Assignee: PIXTREE CO., LTD. (KR)

( * ) Notice: Subject to any disclaimer, the term of this patent is extended or adjusted under 35 U.S.C. 154(b) by 511 days.

(21) Appl. No.: 17/789,167

(22) PCT Filed: Dec. 18, 2020

(86) PCT No.: PCT/KR2020/018684
§ 371 (c)(1),
(2) Date: Jun. 24, 2022

(87) PCT Pub. No.: WO2021/133001
PCT Pub. Date: Jul. 1, 2021

(65) Prior Publication Data
US 2023/0051832 A1    Feb. 16, 2023

(30) Foreign Application Priority Data
Dec. 26, 2019  (KR) ................. 10-2019-0174883

(51) Int. Cl.
*G06T 5/77* (2024.01)
*G06T 5/50* (2006.01)
(Continued)

(52) U.S. Cl.
CPC ............ *G06T 5/77* (2024.01); *G06T 5/50* (2013.01); *G06T 7/11* (2017.01); *G06T 7/13* (2017.01);
(Continued)

(58) Field of Classification Search
None
See application file for complete search history.

(56) References Cited

U.S. PATENT DOCUMENTS

2014/0169695 A1    6/2014  Lin et al.

FOREIGN PATENT DOCUMENTS

| KR | 20150088656 A | 8/2015 |
|---|---|---|
| KR | 101969864 B1 * | 4/2019 |
| WO | 2019098414 A1 | 5/2019 |

OTHER PUBLICATIONS

Free-Form Image Inpainting with Gated Convolution. Yu et al. (Year: 2019).*

(Continued)

*Primary Examiner* — Delomia L Gilliard
(74) *Attorney, Agent, or Firm* — Renaissance IP Law Group LLP

(57) ABSTRACT

Disclosed are a semantic image extrapolation method and a semantic image extrapolation apparatus. The present invention provides a technique for generating an empty region for image-extension in an image by using an extrapolated segmentation map and an inpainting technique. The present invention is to provide, considering that there is no information in an empty region for image-extension in an image, a semantic image extrapolation method, of first generating an extrapolated segmentation map on the basis of a segmentation map from an input image, and filling the empty region for image-extension in the image with information on the basis of the extrapolated segmentation map and the input image.

10 Claims, 4 Drawing Sheets

(51) Int. Cl.
*G06T 7/11* (2017.01)
*G06T 7/13* (2017.01)
*G06V 10/764* (2022.01)
*G06V 20/70* (2022.01)

(52) U.S. Cl.
CPC ............ *G06V 10/764* (2022.01); *G06V 20/70* (2022.01); *G06T 2207/20081* (2013.01)

(56) References Cited

OTHER PUBLICATIONS

International Search Report for PCT/KR2020/018684 mailed Mar. 15, 2021.
Yu, Jiahui et al., "Free-Form Image Inpainting with Gated Convolution", 2019 IEEE/CVF International Conference on Computer Vision (ICCV), 2019, pp. 4470-4479.

* cited by examiner

SEMANTIC IMAGE EXTRAPOLATION METHOD AND APPARATUS

FIELD OF INVENTION

The present invention relates to a semantic image extrapolation method and a semantic image extrapolation apparatus.

BACKGROUND OF THE INVENTION

The content described below merely provides background information related to the present invention and does not define the related art.

In order to form a new image according to users demand, an image editing/compositing technology that edits or synthesizes image fragments has been developed in various ways. The image editing/compositing technology has generally been developed for the purpose of erasing unwanted image parts or separating desired parts for composition with new parts.

For image composition, it is necessary to extract an object in an image. As an image segmentation technique for extracting an object, techniques such as the Watershed algorithm or the Graph Cut algorithm have been used in various ways.

As a technique developed for image resizing, a seam carving/insertion algorithm has been used. The seam carving algorithm calculates the degree of importance between respective pixels in an original image, sets a seam that connects pixels of a low degree of importance, and removes or inserts the seams in an ascending order of degrees of importance to reduce or enlarge the size of the image. The seam carving technique was originally designed for the purpose of displaying images without distortion in apparatus with various resolutions.

In the related art, a method for simply overlaying an object image on a background image has been used. Even in the process of image enlargement and reduction, the entire image is simply enlarged or reduced regardless of the ratio of the object image to the background image, which results in a limitation in image editing/compositing, thereby making it difficult to provide a natural composite image.

SUMMARY OF THE INVENTION

The present invention provides a technique for generating an empty region for image-extension in an image by using an extrapolated segmentation map and an inpainting technique. An object of the present invention is to provide, considering that there is no information in an empty region for image-extension in an image, a semantic image extrapolation method of first generating an extrapolated segmentation map on the basis of a segmentation map from an input image, and filling the empty region for image-extension in the image with information on the basis of the extrapolated segmentation map and the input image, and a semantic image extrapolation apparatus.

According to one aspect of the present embodiment, there is provided a semantic image extrapolation method including: receiving an input image (I); generating a segmentation map ($S\hat{}$) using an artificial intelligence model learned in advance on the basis of deep learning from the input image (I); generating an extrapolated segmentation map ($S\hat{}_E$) on the basis of the segmentation map ($S\hat{}$) using the artificial intelligence model; generating a padded image ($I_p$) including a region to be extended on the basis of the input image (I); and generating an extrapolated image ($I\hat{}_E$) by combining the padded image ($I_p$) and the extrapolated segmentation map ($S\hat{}_E$), using the artificial intelligence model.

According to another aspect of the present embodiment, there is provided a semantic image extrapolation apparatus including: an input section that receives an input image (I); a segmentation section that generates a segmentation map ($S\hat{}$) using an artificial intelligence model learned in advance on the basis of deep learning from the input image (I); a segmentation extension section that generates an extrapolated segmentation map ($S\hat{}_E$) on the basis of the segmentation map ($S\hat{}$) using the artificial intelligence model; an image padding section that generates a padded image ($I_p$) including a region to be expanded on the basis of the input image (I); and an image extension section that generates an extrapolated image ($I\hat{}_E$) by combining the padded image ($I_p$) and the extrapolated segmentation map ($S\hat{}_E$), using the artificial intelligence model.

As described above, according to the present embodiment, there is provided a technique for generating an empty region for image-extension an image using an extrapolated segmentation mapand an inpainting technique. Considering that there is no information in the empty region for image-extension, by first generating the extrapolated segmentation map on the basis of a segmentation map from an input image, it is possible to fill the empty region for image-extension in the image with information on the basis of the extrapolated segmentation map and the input image.

DETAILED DESCRIPTION OF THE INVENTION

Hereinafter, embodiments of the present invention will be described in detail with reference to the accompanying drawings.

Figure 1:
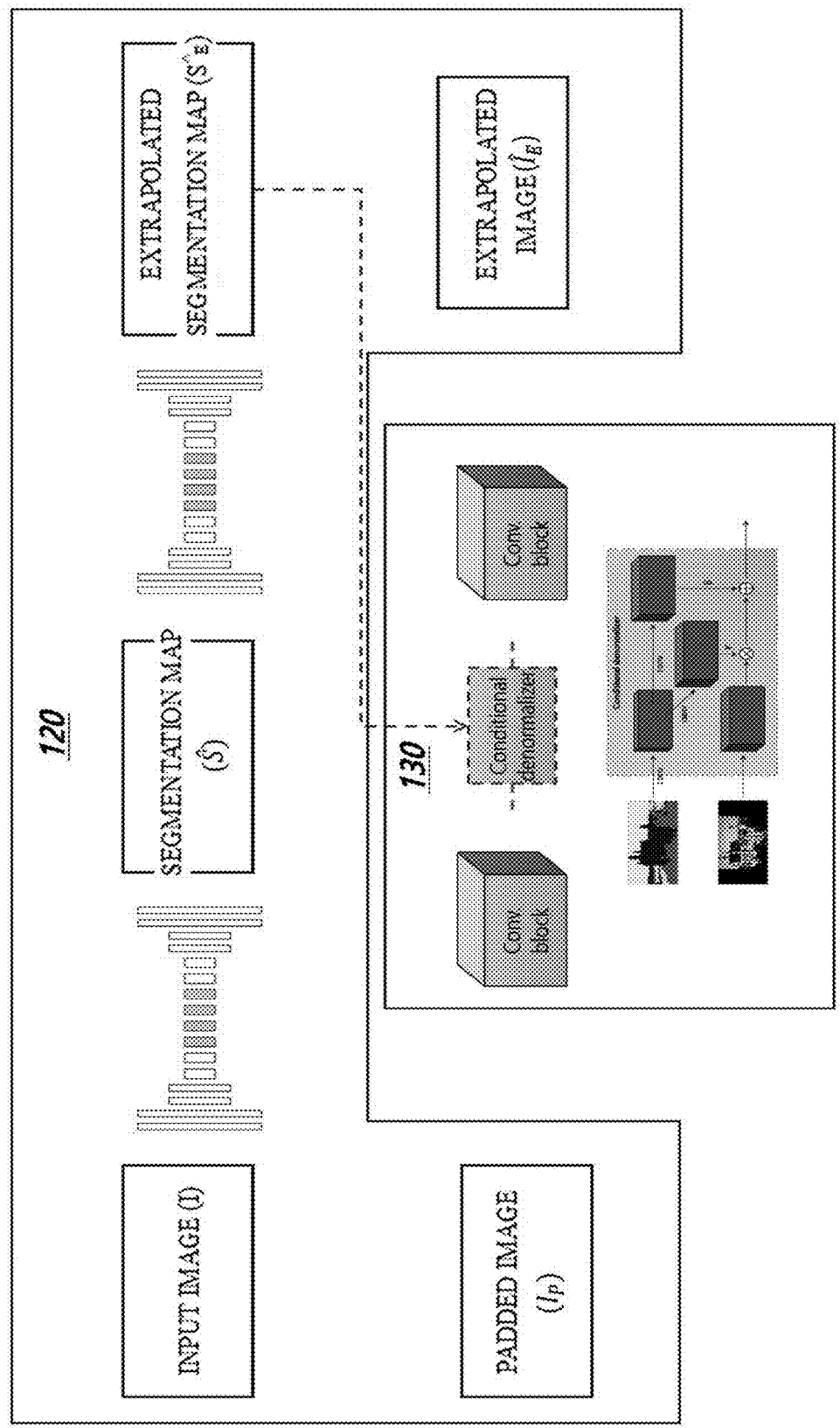
FIG. 1 is a block diagram schematically showing a semantic image extrapolation apparatus that explorates an image to be filled in an empty region according to an embodiment of the present invention.

FIG. 1 is a block diagram schematically showing a semantic image extrapolation apparatus that extrapolates an image to be filled in an empty region according to an embodiment of the present invention.

A semantic image extrapolation apparatus 110 according to the present embodiment generates an empty region in which an image is to be extended using a segmentation map and an inpainting technique on the basis of an image extrapolation program 120.

The semantic image extrapolation apparatus 110 first generates a segmentation map from an input image using the image extrapolation program 120, and then fills an empty region of an image for image-extension with information on the basis of the segmentation map and the input image information.

The semantic image extrapolation apparatus 110 may be a user terminal, an application server, a service server, or a server terminal in which the image extrapolation program 120 is installed.

The semantic image extrapolation apparatus 110 may include a variety of devices such as (i) a communication device such as a communication modem for performing communication with various devices or wired/wireless communication networks, (ii) a memory for storing various programs and data for semantic image extrapolation, and (iii) a microprocessor for executing and controlling the image extrapolation program 120. According to at least one exemplary embodiment, the memory may be a computer-readable recording/storage medium such as a RAM (Random Access Memory), a ROM (Read Only Memory), a flash memory, an optical disc, a magnetic disc, or an SSD (Solid State Disk). According to at least one exemplary embodiment, the microprocessor may be programmed to selectively perform one or more of the operations and functions described herein. According to at least one exemplary embodiment, the microprocessor may be implemented as hardware such as an ASIC (Application Specific Integrated Circuit) or the like with a specific configuration, in whole or in part.

The semantic image extrapolation apparatus 110 according to the present embodiment does not enlarge an input image (I) using the image extrapolation program 120, but creates an image similar to the input image through deep learning.

The image extrapolation program 120 is a program for image-filling in a part having no information in an image. In general, since it is very difficult to perform image-filling in a part without information in an image directly from an input image, the image exploration program 120 first creates a segmentation map (S^). Thereafter, the image extrapolation program 120 generates an extrapolated segmentation map (S^E) on the basis of the segmentation map (S^) using an artificial intelligence model 130, and image-fills in the information-missing part in the image using information on the extrapolated segmentation map (S^E) and information on the input image (I). Here, the artificial intelligence model 130 may be implemented as an artificial intelligence network.

The image extrapolation program 120 guides an image ($I_p$) padded through artificial intelligence to an empty region for image-extension and fills the empty region with the padded image ($I_p$) together with the input image (I), using the artificial intelligence model 130. The image extrapolation program 120 may calculate a total color distribution value by shifting a mean non-normalization value of the input image (I) and dividing it by a variance value. The image extrapolation program 120 uses, as reference data, the input image (I) and the padded image ($I_p$) as inputs. The image extrapolation program 120 may create a final image by combining an image for an original image, a mask position, and a segment guide using the artificial intelligence model 130.

The artificial intelligence model 130 generates a new learning model by receiving an empty region for image-extension, an extended image, and existing image information as inputs.

The image extrapolation program 120 creates the extrapolated segmentation map ($S^{\wedge}_E$) by extending the segmentation map (S^) using the artificial intelligence model 130. The image extrapolation program 120 generates an extrapolated image ($I^{\wedge}_E$) by combining the padded image ($I_p$) including the region for image-extension from the input image (I) and the extrapolated segmentation map ($S^{\wedge}_E$).

The image extrapolation program 120 extends the input image (I) as needed to generate the padded image ($I_p$), and sets the size of the empty region for image-extension using the artificial intelligence model 130 when creating the extrapolated segmentation map ($S^{\wedge}_E$).

When creating the extrapolated segmentation map (S^E) from the segmentation map (S^) using the artificial intelligence model 130, the image extrapolation program 120 creates the extrapolated segmentation map ($S^{\wedge}_E$) on the basis of information obtained by padding information in a boundary of the empty region for image-extension.

The image extrapolation program 120 creates the extrapolated segmentation map ($S^{\wedge}_E$) by combining the original image (image before extension) and the segmentation map ($S^{\wedge}_E$). The extrapolated segmentation map ($S^{\wedge}_E$) includes information about where the image belongs. For example, the image extrapolation program 120 expresses the same region by color expressed in the extrapolated segmentation map ($S^{\wedge}_E$) according to a training data set.

The image extrapolation program 120 generates an empty region for image-extension using the extrapolated segmentation map ($S^{\wedge}_E$) and the inpainting technique. Since there is no information in the empty region for image-extension, the image extrapolation program 120 first generates the extrapolated segmentation map ($S^{\wedge}_E$) on the basis of the segmentation map (S^) from the input image (I), and fills the empty region with information on the basis of the extrapolated segmentation map ($S^{\wedge}_E$) and the input image (I).

Figure 2:
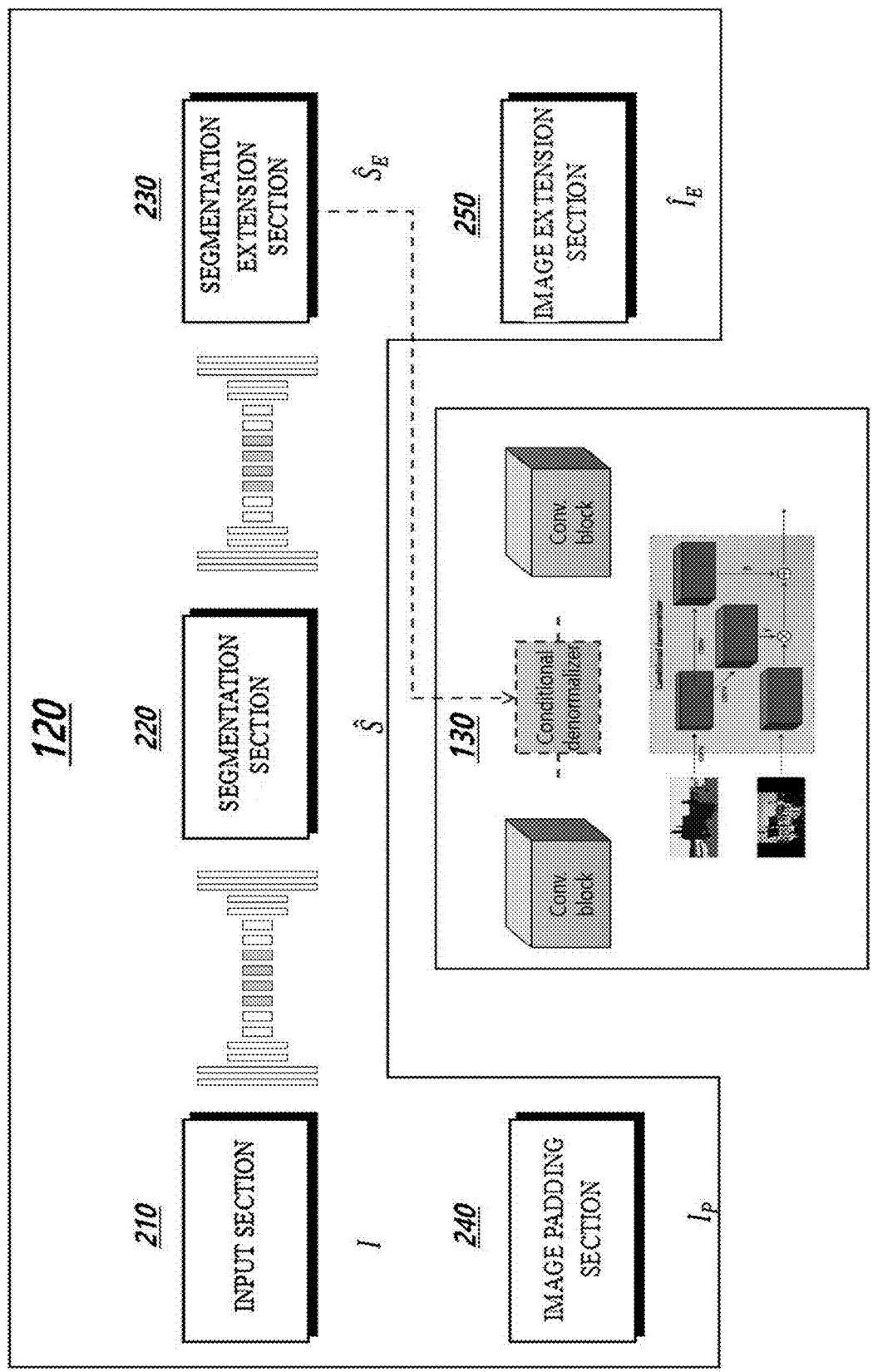
FIG. 2 is a block diagram schematically showing a semantic image extrapolation program that is installed in the semantic image extrapolation apparatus according to the embodiment of the present invention.

FIG. 2 is a block diagram schematically showing the image extrapolation program installed in the semantic image extrapolation apparatus according to the present embodiment.

The image extrapolation program 120 according to the present embodiment includes an input section 210, a segmentation section 220, a segmentation extension section 230, an image padding section 240, and an image extension section 250. The components included in the image extrapolation program 120 are not necessarily limited thereto.

The image extrapolation program 120 is a program that is installed and driven in the semantic image extrapolation apparatus 110, and the respective components included in the image extrapolation program 120 may be connected to a communication path connecting a software module or a hardware module inside the device and may be operated in a cooperative manner. These components perform communication therebetween using one or more communication buses or signal lines.

Each component of the image reasoning program 120 shown in FIG. 2 refers to a unit for processing at least one function or operation, and may be implemented as a software module, a hardware module, or a combination of software and hardware.

The input section 210 receives the input image (I).

The segmentation section 220 generates the segmentation map (S^) using the artificial intelligence model 130 learned in advance on the basis of deep learning from the input image (I).

The segmentation section 220 may use the inpainting technique when generating the segmentation map (S^), but the present invention is not limited thereto. When the segmentation section 220 generates the segmentation map (S^) using the artificial intelligence model 130, in a case where a data set learned on the basis of the deep learning is insufficient, a weakly-supervised learning technique may be used, but the present invention is not necessarily limited thereto.

The segmentation extension section 230 generates the extrapolated segmentation map ($\hat{S}_E$) on the basis of the segmentation map ($\hat{S}$) using the artificial intelligence map 130.

The segmentation extension section 230 generates a padded segmentation map ($\hat{S}_p$) in which an empty region is filled by performing interpolation, instead of keeping the empty region in a mask state. The segmentation extension section 230 generates the extrapolated segmentation map ($\hat{S}_E$) from the padded segmentation map ($\hat{S}_p$) using the artificial intelligence model 130.

In a case where there is no information in the empty region, the segmentation extension section 230 generates the padded segmentation map ($\hat{S}_p$) by copying values of pixels located on an edge boundary closest to the empty region. The segmentation extension section 230 allows an object or a region to be extended in the image to be expressed as the same color as that of the same object or region in the extrapolated segmentation map ($\hat{S}E$).

The image padding section 240 generates the padded image ($I_p$) including the region for image-extension on the basis of the input image (I). The image extension section 250 generates an extrapolated image ($\hat{I}_E$) by combining the padded image ($I_p$) and the extrapolated segmentation map ($\hat{S}_E$) using the artificial intelligence model 130.

When generating the extrapolated image ($\hat{I}_E$), the image extension section 250 uses at least one of channel concatenation and conditional denormalization to transmit information in the extrapolated segmentation map ($\hat{S}E$).

In a case where channel information for each image is input to the artificial intelligence model 130 using channel concatenation, the image extension section 250 inputs the channel information together with the segmentation image to the artificial intelligence model 130. The image extension section 250 shifts a mean and a standard deviation of each object into a mean and a standard deviation of a specific object on the basis of statistical features of classes in the image using the conditional denormalization. The image extension section 250 may combine the padded image ($I_p$) and the extrapolated segmentation map ($\hat{S}_E$) to generate an extrapolated image ($\hat{I}_E$), using gated convolution, but the invention is not necessarily limited thereto.

Figure 3:
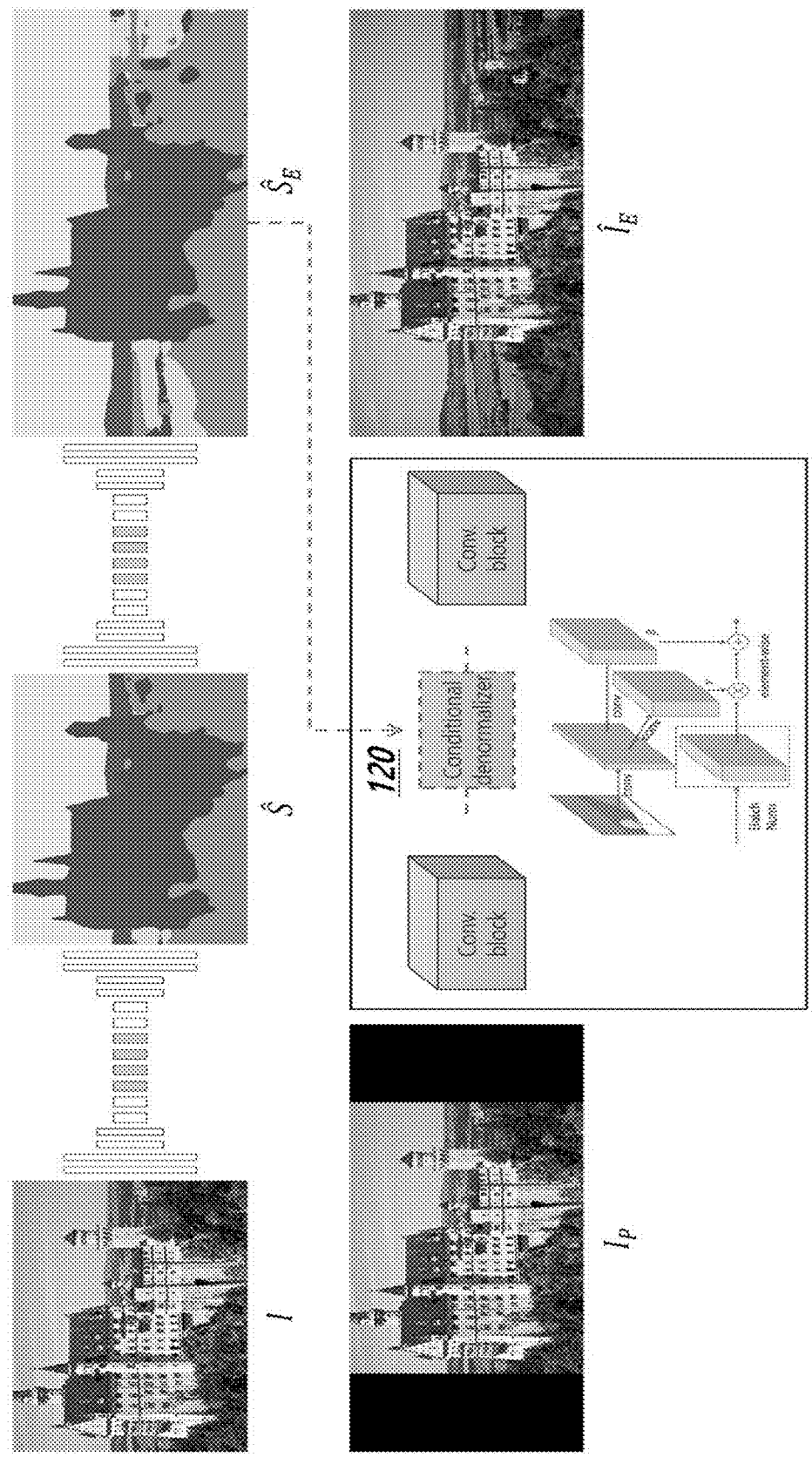
FIG. 3 is a diagram illustrating a method of extrapolating a semantic image to be filled in an empty region according to the embodiment of the present invention.

FIG. 3 is a diagram illustrating a method of extrapolating a semantic image to be filled in an empty region according to the present embodiment.

The image extrapolation program 120 predicts the segmentation map ($\hat{S}$) using the artificial intelligence model 130 from the input image (I). In this case, the image extrapolation program 120 may use the weakly-supervised learning technique in a case where there is not enough a data set suitable for a test environment for creating the segmentation map ($\hat{S}$).

When predicting the segmentation map ($\hat{S}$) from the input image (I), the image extrapolation program 120 additionally uses a data set learned on the basis of deep learning (for example, learning data in a case where there are a lot of persons as in a concert hall). The image extrapolation program 120 may create one input image (I) as one segmentation map ($\hat{S}$) in a case where the input image (I) is an image consisting only of buildings and people without a space such as the sky like a concert hall. The image extrapolation program 120 may use a supervised-learning technique when creating one input image (I) as one segmentation map ($\hat{S}$).

The image extrapolation program 120 predicts the extrapolated segmentation map ($\hat{S}E$) from the segmentation map ($\hat{S}$) using the artificial intelligence model 130. In this case, the image extrapolation program 120 may use the padded segmentation map ($\hat{S}_p$) instead of the segmentation map ($\hat{S}$) to stabilize learning. The image extrapolation program 120 may use a method of copying edge pixel values when generating the padded segmentation map ($\hat{S}_p$).

After the segmentation map ($\hat{S}$) is predicted, the image extrapolation program 120 generates the extrapolated segmentation map ($\hat{S}_E$) on the basis of the segmentation map ($\hat{S}$). The image extrapolation program 120 generates the extrapolated segmentation map ($\hat{S}_E$) instead of simply extending edge portions of the image.

The image extrapolation program 120 creates the padded segmentation map ($\hat{S}_p$) by filling the empty region using interpolation, instead of keeping the empty region in the form of a mask. In this case, the artificial intelligence model 130 may use the padded segmentation map ($\hat{S}_p$) for learning. For example, when there is no information about the empty region, the image extrapolation program 120 may generate the padded segmentation map ($\hat{S}_p$) to have similar information by copying information about edge boundaries adjacent to the empty region.

The image extrapolation program 120 predicts the extrapolated image ($\hat{I}_E$) using the padded image ($I_p$) and the extrapolated segmentation map ($\hat{S}_E$). In this case, the image extrapolation program 120 may use channel concatenation to transmit information on the extrapolated segmentation map ($\hat{S}_E$). The image extrapolation program 120 may use conditional denormalization to transmit the information on the extrapolated segmentation map ($\hat{S}E$).

The image extrapolation program 120 generates the extrapolated image (I E) using the padded image ($I_p$) and the extrapolated segmentation map ($\hat{S}_E$). The image extrapolation program 120 may use a method of channel-concatenating two channels to combine the padded image ($I_p$) and the extrapolated segmentation map ($\hat{S}_E$). In the channel concatenation, one image (I) has 3 channels. In a case where the 3-channel image is input as a convolution input of the artificial intelligence model 130, a segmentation image is merged together so as to be input to the 6-channel artificial intelligence model 130. That is, in a case where the channel concatenation is used, two pieces of channel information may be combined and input to the artificial intelligence model 130.

The image extrapolation program 120 may use the conditional denormalization to combine the padded image ($I_p$) and the extrapolated segmentation map ($\hat{S}_E$).

The image extrapolation program 120 shifts a mean and a standard deviation of each object having different features, which are statistical features of classes, into a mean and a standard deviation of a specific object in the image, using the conditional denormalization. The image extrapolation program 120 performs normalization by subtracting the mean from features of an input image and dividing the result by the standard deviation using the conditional denormalization. Thus, a normalized input feature map is created. In performing denormalization, the result is multiplied by γ and is then added by β. Here, γ and β are not generated on the basis of the original image, but are determined through deep learning convolution on the basis of information on the map that is delivered as a condition. For example, Adaptive Instance Normalization or Spatial Adaptive Normalization may be used.

The image extrapolation program 120 may combine the padded image ($I_p$) and the extrapolated segmentation map ($\hat{S}_E$) to generate an extrapolated image ($\hat{I}_E$), using the gated convolution.

The image extrapolation program 120 sets erased parts using the gated convolution, and performs sequential change to a convolution kernel for CNN. The image extrapolation program 120 applies the same kernel to the image using the gated convolution, and fills an information-region with information through convolution. The image extrapolation program 120 does not perform convolution on a mask (region without information) using the gated convolution, but fills boundary regions between the information-region and the region without information little by little.

In order to fill the region (space) for image-extension, the image extrapolation program 120 first extends the segmentation map ($\hat{S}$), and reflects the extrapolated segmentation map ($\hat{S}E$) in the region (space) for image-extension.

The image extrapolation program 120 may apply the gated convolution on the basis of the extrapolated segmentation map ($\hat{S}E$), but the gated convolution is not limiting, and various artificial intelligence techniques may be applied. The image extrapolation program 120 may use the inpainting technique when generating the segmentation map ($\hat{S}$).

Figure 4:
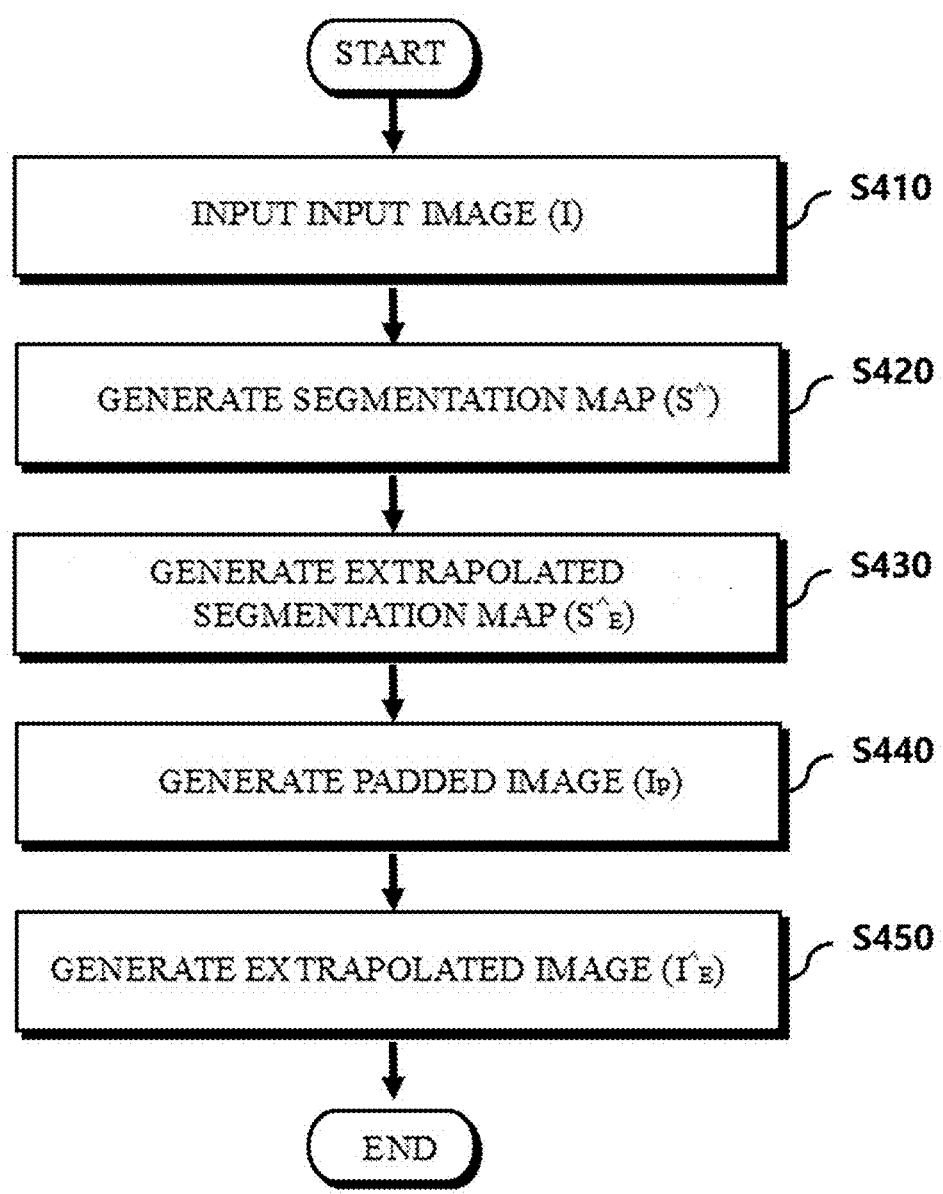
FIG. 4 is a flowchart illustrating a method of explorating a semantic image to be filled in an empty region according to the embodiment of the present invention.

FIG. 4 is a flowchart illustrating a method of extrapolating a semantic image to be filled in an empty region according to the embodiment of the present invention.

The image extrapolation program 120 receives the input image (I) (S410).

The image extrapolation program 120 generates the segmentation map ($\hat{S}$) using the artificial intelligence model 130 learned in advance on the basis of deep learning from the input image (I) (S420). In step S420, the image extrapolation program 120 may use the inpainting technique when generating the segmentation map ($\hat{S}$), but the present invention is not limited thereto.

When generating the segmentation map ($\hat{S}$) using the artificial intelligence model 130, the image extrapolation program 120 may use the weakly-supervised learning technique in a case where a data set learned on the basis of the deep learning is insufficient, but the present invention is not necessarily limited thereto.

The image extrapolation program 120 generates the extrapolated segmentation map ($\hat{S}_E$) on the basis of the segmentation map ($\hat{S}$) using the artificial intelligence model 130 (S430). In step S430, the image extrapolation program 120 generates the padded segmentation map ($\hat{S}_p$) in which an empty region is first filled through interpolation instead of keeping the empty region in the form of a mask. The image extrapolation program 120 generates the padded segmentation map ($\hat{S}_p$) as the extrapolated segmentation map ($\hat{S}_E$) using the artificial intelligence model 130.

In a case where there is no information in the empty region at all, the image extrapolation program 120 copies values of pixels located on an edge boundary closest to the empty region to generate the padded segmentation map ($\hat{S}_p$). The image extrapolation program 120 causes an object or a region to be extended in the image in the extrapolated segmentation map ($\hat{S}_E$) to be expressed as the same color as that of the same object or region.

The image extrapolation program 120 generates the padded image ($I_p$) including a region for image-extension on the basis of the input image (I) (S440).

The image extrapolation program 120 generates the extrapolated image ($\hat{I}_E$) by combining the padded image ($I_p$) and the extrapolated segmentation map ($\hat{S}_E$), using the artificial intelligence model 130 (S450). In step S450, the image extrapolation program 120 uses at least one of channel concatenation and conditional denormalization to transmit information in the extrapolated segmentation map ($\hat{S}_E$) when generating the extrapolated image ($\hat{I}_E$).

In a case where channel information for each image is input to the artificial intelligence model 130 using the channel concatenation, the image extrapolation program 120 causes the channel information and the segmentation image to be input together to the artificial intelligence model 130.

The image extrapolation program 120 shifts a mean and a standard deviation of each object into a mean and a standard deviation of a specific object on the basis of statistical features of classes in the image using the conditional denormalization.

The image extrapolation program 120 may combine the padded image ($I_p$) and the extrapolated segmentation map ($\hat{S}_E$) using the gated convolution to generate the extrapolated image ($\hat{I}_E$), but the present invention is not necessarily limited thereto.

Although it is shown that steps S410 to S450 are sequentially executed in FIG. 4, the present invention is not limited thereto. In other words, a method of changing the sequence of the steps in FIG. 4 or a method of executing one or more steps in parallel may be used as necessary.

The semantic image extrapolation method according to the present embodiment shown in FIG. 4 may be implemented as a program, and may be recorded on a computer-readable recording medium. The computer readable recording medium on which the program for implementing the semantic image extrapolation method according to the present embodiment is recorded includes all types of recording devices in which data that can be read by a computer system is stored.

The above description is merely illustrative of the technical idea of the present invention, and various modifications and variations can be made without departing from the essential features of the invention by those with ordinary skill in the technical field to which the invention belongs. Accordingly, the above embodiments are intended to describe the present invention instead of limiting the technical idea of the invention, and the scope of the technical idea of the invention is not limited by the embodiments. The protection scope of the invention should be interpreted according to the following claims, and all technical ideas within the scope equivalent thereto should be interpreted as being included in the scope of the invention.

EXPLANATION OF SYMBOLS

110: Semantic image extrapolation apparatus
120: Image extrapolation program
130: Artificial intelligence model
210: Input section
220: Segmentation section
230: Segmentation extension section
240: Image padding section
250: Image extension section
I: Input image
$I_p$: Padded image
$\hat{I}_E$: Extrapolated (Predicted) image
$\hat{S}$: (Predicted) Segmentation map
$\hat{S}_P$: Padded (Predicted) segmentation map
$\hat{S}_E$: Extrapolated (Predicted) segmentation map

What is claimed is:
1. A semantic image extrapolation method comprising:
receiving an input image (I);

generating a segmentation map (Ŝ) using a first artificial intelligence model learned in advance on the basis of deep learning from the input image (I);
generating an extrapolated segmentation map (Ŝ$_E$) on the basis of the segmentation map (Ŝ) using a second artificial intelligence model;
generating a padded image (I$_P$) including a region for image-extension on the basis of the input image (I); and
generating an extrapolated image (Î$_E$) by combining the padded image (I$_P$) and the extrapolated segmentation map (Ŝ$_E$), using a third artificial intelligence model,
wherein in the generation of the extrapolated segmentation map (Ŝ$_E$), instead of keeping the empty region in the form of a mask, a padded segmentation map (Ŝ$_P$) in which an empty region is filled through interpolation is first generated, and the padded segmentation map (Ŝ$_P$) is generated as the extrapolated segmentation map (Ŝ$_E$) using the second artificial intelligence model.

2. The semantic image extrapolation method according to claim 1,
wherein in the generation of the segmentation map (Ŝ), an inpainting technique is used in generating the segmentation map (Ŝ).

3. The semantic image extrapolation method according to claim 2,
wherein in the generation of the segmentation map (Ŝ), in a case where a data set learned on the basis of the deep learning is insufficient in generating the segmentation map (Ŝ), a weakly-supervised learning technique is used.

4. The semantic image extrapolation method according to claim 1,
wherein in the generation of the extrapolated image (Î$_E$), at least one of channel concatenation and conditional denormalization is used to transmit information in the extrapolated segmentation map in generating the extrapolated image (Î$_E$).

5. The semantic image extrapolation method according to claim 4,
wherein in the generation of the extrapolated image (Î$_E$), in a case where channel information for each image is input to the third artificial intelligence model using the channel concatenation, the channel information and a segmentation image are input together to the third artificial intelligence model.

6. The semantic image extrapolation method according to claim 4,
wherein in the generation of the extrapolated image (Î$_E$), a mean and a standard deviation of each object are shifted into a mean and a standard deviation of a specific object on the basis of statistical features of classes in the image using the conditional denormalization.

7. The semantic image extrapolation method according to claim 1,
wherein in the generation of the extrapolated image (Î$_E$), the padded image (I$_P$) and the extrapolated segmentation map (Ŝ$_E$) are combined using gated convolution to generate the extrapolated image (Î$_E$).

8. The semantic image extrapolation method according to claim 1,
wherein in the generation of the extrapolated segmentation map (Ŝ$_E$), in a case where there is no information in the empty region, values of pixels located on an edge boundary closest to the empty region are copied to generate the padded segmentation map (Ŝ$_P$).

9. The semantic image extrapolation method according to claim 8,
wherein in the generation of the extrapolated segmentation map (Ŝ$_E$), an object or a region for image-extension in the image in the extrapolated segmentation map (Ŝ$_E$) is expressed as the same color as that of the same object or region.

10. A semantic image extrapolation apparatus comprising:
a memory configured to store software modules and data for semantic image extrapolation;
a microprocessor configured to execute and control the software modules and comprising:
an input module configured to receive an input image (I);
a segmentation module configured to generate a segmentation map (Ŝ) using a first artificial intelligence model learned in advance on the basis of deep learning from the input image (I);
a segmentation extension module configured to generate an extrapolated segmentation map (Ŝ$_E$) on the basis of the segmentation map (Ŝ) using a second artificial intelligence model;
an image padding section that generats module configured to generate a padded image (I$_P$) including a region for image-extension on the basis of the input image (I); and
an image extension module configured to generate an extrapolated image (Î$_E$) by combining the padded image (I$_P$) and the extrapolated segmentation map (Ŝ$_E$), using a third artificial intelligence model,
wherein the segmentation extension module is further configured to:
generate firstly a padded segmentation map (Ŝ$_P$) in which an empty region is filled through interpolation, instead of keeping the empty region in the form of a mask; and
generate the padded segmentation map (Ŝ$_P$) as the extrapolated segmentation map (Ŝ$_E$) using the second artificial intelligence model.

* * * * *